United States Patent Office 3,459,576
Patented Aug. 5, 1969

3,459,576
ACID-REACTING CERAMIC GRADE
ANATASE TiO₂ PIGMENT
Donald J. Smith, Seaford, Del., assignor to E. I. du Pont
de Nemours and Company, Wilmington, Del., a corporation of Delaware
No Drawing. Filed Nov. 30, 1966, Ser. No. 597,843
Int. Cl. C09c 1/36; C03c 5/02
U.S. Cl. 106—300                                   4 Claims

ABSTRACT OF THE DISCLOSURE

Pulverulent acid-reacting anatase $TiO_2$ product containing 0.1% to 3.0% of adsorbed $H_2SO_4$, for use in glass (ceramic) formulations, prepared by calcining at low 650–850° C. temperatures a previously washed, salt-free hydrolyzate from the hydrolysis of a concentrated titanium sulfate solution until a portion only of the adsorbed sulfuric acid present in said hydrolyzate is removed.

INVENTION BACKGROUND

This invention relates to the manufacture of an improved $TiO_2$ ceramic pigment and more particularly to the production of an acid-reacting $TiO_2$ pigment useful in preparing glass or vitreous enamel compositions.

Titanium dioxide is a well-known white pigment which is used to a considerable extent in glass formulations to increase the refractive index of the resulting glass or to decrease the amount of ultraviolet light transmitted by the glass. Larger amounts of the pigment are used in making enamel frits for coating metal. The higher opacity of the $TiO_2$ over other pigments permits thinner and more desirable enamel coats. The available sources of titanium dioxide heretofore have been ground natural rutile and pigmentary forms of that product which may be in either the anatase or rutile crystalline modification. Due to the massive state of natural rutile and the difficulty in grinding it to very fine particle size, this product dissolves with difficulty in glass melts. Similarly, pigmentary grades of $TiO_2$, although sufficiently pure and finer than such ground material, still dissolve rather slowly in the glass melt, and the rutile crystal form is the more difficult to dissolve, other factors being equal.

Efforts to produce special grades of $TiO_2$ for well known enamel frit applications have involved the use of relatively dilute hydrolyses to obtain a free flowing $TiO_2$ product adapted for easy handling in the blending of the glass components. The $TiO_2$ from such procedures have resulted in impure products containing relatively high concentrations of colored ions, such as iron, chromium, etc. These impurities cannot be tolerated in more than trace, small amounts in preparing a desired white enamel. In such procedures a dusting nuisance is encountered to overcome which various process modifications have been proposed. One such improvement involves that described in U.S. 2,448,683 wherein the separate, and relatively expensive, steps of peptizing a portion of the $TiO_2$ hydrolyzate in hydrochloric acid, is undertaken, followed by filtering and washing this fraction and then blending it with the main portion of the raw pigment product prior to calcining the mixture while free from loosely bound sulfuric acid.

SUMMARY OF INVENTION

This invention provides an undercalcined, acid-reacting, salt-free, non-dusting anatase $TiO_2$ product which is particularly adapted for use as an opacifying agent in ceramic manufacture, said product being at least 80% anatase and having an acid reaction in water, with the particles thereof having a projected group average diameter of less than 0.1 micron and preferably in the range of from .01 to 0.1 micron.

The product of this invention is a pulverulent acid-reacting titanium dioxide in predominantly anatase crystal structure containing in its primary or simplest form from 95 to 99.8% $TiO_2$, and preferably from 0.1% to about 3.0% of adsorbed $H_2SO_4$, said percentages being by weight based on the $TiO_2$ content. The ultimate particles are finer than the primary crystallites of a pigment and have a projected group average particle diameter on a numerical bases of less than 0.1 micron. These particles are aggregated or flocculated for the most part giving rise to satisfactory physical properties to insure ready handling and freedom from dusting. The product is substantially free from discoloring matter and hence is eminently suited for incorporation in conventional type glass and white enamel frit compositions.

In preparing the ceramic grade anatase $TiO_2$ of this invention, a $TiO_2$ hydrolyzate is precipitated by conventional methods as by boiling a concentrated titanium sulfate solution in accordance with the procedures of, for example, U.S. Reissue Patent 18,854. It is then washed free of undesired impurities and water soluble salts but contains adsorbed sulfuric acid in amounts as high as 8% by weight based on the $TiO_2$. This acid, referred to as adsorbed or chemisorbed, may also be present, for example, as a basic titanium sulfate e.g. $TiOSO_4$ which decomposes at the higher temperatures. The salt-free hydrolyzate recovered from the washing and partially dewatering step is calcined to final temperatures in the range of from 650 to 850° C., during which a portion, but not all, of the free or adsorbed sulfuric acid is driven off. The resulting calciner discharge can be subjected to mild disintegration treatment to break up lumps prior to blending with the glass composition. If desired, the calciner discharge can be dry ground more vigorously as in a micropulverizer or a fluid energy mill to break the aggregates down to sizes such that at least 95%, and preferably 99%, of the product will pass a 325 mesh U.S. Standard sieve. If desired, the dry milling step can be deferred until after the calcined product is mixed with the powdered glass components and the whole mixture milled. This procedure has the advantage of providing a more granular free flowing nature to the unmilled calcined product, yet after milling the whole glass mix the $TiO_2$ is dispersed enough to dissolve readily thereby avoiding formation of sintered undesired agglomerates of $TiO_2$ which might persist as dark blue inclusions in the glass.

DESCRIPTION OF PREFERRED EMBODIMENTS

The raw anatase $TiO_2$ employed herein can be obtained by hydrolyzing relatively concentrated titanium salt solutions, preferably such as obtained by the solution of a titaniferous ore, such as ilmenite or a titaniferous slag in sulfuric acid. Such solution with the iron present in the divalent state, is clarified and concentrated by evaporation of water to at least 200 gm. $TiO_2$/liter or as high as 275 g./l. The resulting concentrate, while still hot, is run into a heel of hot water in an associated, heated tank. The amount of water employed is such that the resulting mixture contains not less than 150 g./l. $TiO_2$ (total) and preferably not less than 175 g./l. The mixture is then nucleated by the action of the hot water, and is heated to the boil for about 3 to 5 hours to obtain precipitation of the $TiO_2$ in hydrous oxide form. During the boil, more water may be added to increase the yield, but the final, total $TiO_2$ concentration is preferably not allowed to go much below 150 g./l. This method of precipitating high quality titania is in accordance with the procedures of U.S. Patent 1,795,467 (reissued as No. 18,854). The precipitate is filtered and washed to remove soluble substances, especially ferrous sulfate, as well as the non-adsorbed sulfuric acid. These solids can be further purified by repulping in dilute sulfuric acid containing a small amount of titanous sulfate, filtering and washing again. The salt-free filter cake obtained is then heated to drive off a part of the sulfuric acid, as by passing the material through a direct fired rotary kiln in which the maximum charge temperature and time of retention is such that a small amount, usually from 0.1 to 3.0% and preferably not over 1% of adsorbed sulfuric acid is left in the final product. Time is less a factor than temperature in controlling the residual acid. The temperature-acid relationship is shown in the following data obtained by calcining samples in silica flasks rotating inside a furnace chamber. The samples were gradually brought to temperature over six hours.

| Temp., °C. | Percent $TiO_2$ | Percent $SO_4^=$ |
| --- | --- | --- |
| 530 | 89.7 | 5.5 |
| 630 | 93.7 | 3.4 |
| 730 | 96.8 | 1.6 |
| 820 | 98.6 | 0.28 |
| 850 | 98.8 | 0.1 |

Variations in hydrolysis procedure may change this relationship slightly so it is preferred that the calcination be controlled on the basis of residual acid. More than 3% of $H_2SO_4$ does not lessen the improved solubility characteristics but the amount of fume tends to become a problem. As the sulfuric acid content decreases to zero the crystal growth appears to accelerate and the solution rate in the glass melt becomes correspondingly smaller. An acid content of between 0.1 and 1.0% based on the $TiO_2$ will be found to be most practically useful.

It has been customary and considered necessary in the manufacture of titanium dioxide pigments heretofore that certain salts and agents be added to the kiln feed prior to undertaking calcination. These agents include such salts as sodium sulfate, potassium sulfate, potassium carbonate, and zinc compounds and many others which impart certain desirable properties to the ultimate pigment product. The absence of the use of these agents in obtaining the improved products of this invention leads to the desired complete solution of the new product during its subsequent use in the glass batch.

As will be noted, the essential ingredients of the new $TiO_2$ product are preferably all anatase crystalline structure and sulfuric acid. Although the acid is chiefly present as a control agent to show when the calcination has reached the desired stage, its presence in the mixed glass ingredients proves helpful in that the ensuing evolution of $SO_3$ helps to disperse the $TiO_2$ aggregates thus completely exposing the fine ultimate particles to the solvent action of the glass melt.

Other substances compatible with the glass composition may also be present. This includes the various white oxides which may be derived from the original titaniferous material or added during the manufacturing process. They may be $ZrO_2$, $SiO_2$, $Nb_2O_5$, $Al_2O_3$, $P_2O_5$, $Sb_2O_3$ and the like. Zinc is preferably absent since it usually promotes the formation of the rutile crystal structure. The substances, when derived from the raw materials or process steps do not usually exceed 2% of the whole. Therefore, when taken with the sulfuric acid, they may reach 5% and the $TiO_2$ content in the primary product may be as low as 95%. Discoloring matter such as iron or chromium is preferably low, not more than a few parts per million being present in products for use in white enamels. Further, dilution of this primary product by dry blending with intended components of the glass formulation may be resorted to for purposes of improving its flow and handling characteristics or to facilitate dry milling procedures.

The product of this invention has been characterized in four ways. First, it contains a specific sulfuric acid content. This can be determined by stirring a given weight of the product in water and noting the pH of the water or by titrating the acid to neutrality with standard caustic solution. The acid content is calculated as percent by weight of $H_2SO_4$ based on the $TiO_2$ present. The $TiO_2$ content is determined by well known volumetric oxidimetry of a sample reduced to the titanous state. The second, or particle size, characteristic is measured by examination of electron micrograph of the $TiO_2$ particles. Although the particles are flocculated the individual particles are readily seen. The projected group average particle diameter is a term used to take into account the fact that the particles are usually irregular in shape and exhibit several different diameters, so that the figure used to characterize the whole sample is an average of the average diameters for the individual particles. This compound average is conveniently obtained by measuring one diameter for each particle on the screen or photo, this measurement being taken always in the same direction i.e. all measurements are on parallel diameters. The size distribution is preferably stated in terms of the number of particles. The diameter is further defined as a projected diameter because the measurement is made on the projected image of the actual particle. In making the determination at least 500 particles are measured. They may be in one field or in several fields but in any case all the particles in each chosen field are measured. The product of this invention is characterized as having a projected group average particle diameter for the $TiO_2$ particles of less than 0.1 micron and preferably less than 0.05 micron on a numerical basis. Further, substantially none of the ultimate $TiO_2$ particles are over 0.5 micron in the more preferred products. The third characterization pertains to the crystal structure as measured by X-ray diffraction. The $TiO_2$ in the product should be at least 80% anatase and preferably substantially all (95+ percent) anatase. To this end, known rutile inhibitors, such as $P_2O_5$ can be added to the hydrolyzate prior to calcination. Fourth, the product as discharged from the calciner is substantially free of water soluble alkali salts.

To a clearer understanding of the invention the following example is given which is illustrative of the preparation of my new product and its employment in a conventional type of glass formulation:

Example I

Ilmenite ore containing approximately 62% titanium dioxide was ground to about 200 mesh size and dissolved in strong sulfuric acid. Enough sulfuric acid was used so that the ratio of uncombined $H_2SO_4$ to $H_2SO_4$ combined as $TiOSO_4$ was about 0.75. The resulting solution was clarified by sedimentation, to remove insoluble impurities, and then cooled to reduce the iron content by crystallizing out copperas. Then, after filtration clarification, the solution was concentrated by evaporation to 230 g. $TiO_2/1$. The resulting black solution was run into a hydrolysis tank containing a heel of boiling water in accordance with the procedure of U.S. Reissue Patent 18,854, and the mixture heated to boiling over a period of about 1 hour with boiling being continued for about 3 hours. The resulting white $TiO_2$ hydrolyzate which was obtained was filtered and washed, the filter cake re-pulped and treated with a small amount of sulfuric acid and titanous sulfate solution, filtered and washed again until the resulting filter cake was substantially free of water soluble material except for a few percent of strongly adsorbed sulfuric acid. This filter cake was charged into a rotary kiln calciner at the cold end from which point it traveled through the kiln toward its hot end, the heat being furnished by internal firing by means of a fuel oil burner. The kiln was approximately 150 ft. in length. At a point 30 ft. from the discharge port at the hot end the pigment temperature was approximately 650° C. The maximum temperature near the discharge port was about 800° C. The hot calciner discharge pigment was dropped from the kiln into a rotary tube cooling device and air-cooled therein. The product was in granular form and was subjected to conventional fluid energy milling with dry steam in a 36" diameter micronizer at the rate of 1800 lbs/hr. using a steam to pigment weight ratio of 2.2. The product contained 99.1% $TiO_2$, .3% $P_2O_5$, present as insoluble titanium phosphate, or in part, as iron phosphate, .3% sulfuric acid, .2% water and 25 p.p.m. of iron. The pH of the powder when dispersed in water was 4.2; 0.27% of a sample was retained on a 325 mesh screen. The projected group average primary particle diameter, as determined by inspection of electron micrographs, was 0.075 micron. The resulting product was then employed in making up a glass batch having the following composition:

| | Parts by weight |
|---|---|
| Dehydrated borax | 25.6 |
| Silica | 41.7 |
| Sodium nitrate | 5.7 |
| Sodium fluosilicate | 1.2 |
| Titanium dioxide (99.1%) | 17.7 |

The resulting batch was then melted in the usual fashion, the time required for solution of the $TiO_2$ being less than that required when ground rutile or pigmentary rutile was used. This improved solution-rate proves particularly advantageous when using modern continuous glass furnaces.

The small amount of sulfuric acid present in the product appears to advantageously contribute to its ease of solution in the glass. As already mentioned, the fine $TiO_2$ particles are mostly in small aggregates, and as the temperature of the glass reaches a 900–1200° C. range of temperature acid present in the $TiO_2$ must be driven out as gaseous $SO_3$ or $SO_2$ which can induce disintegration of the aggregates thereby exposing the unusually fine particles to rapid solution. Since the amount of acid is relatively small and is not in excess of 3.0%, no violent expansion is encountered. In addition the moderate degree of temperature employed in the calcination insures the presence of such beneficial amount of sulfuric acid. Due to the adsorbed condition of the acid on the fine particles, the product will be sufficiently inert for packaging in paperbags.

I claim:

1. As a new ceramic grade opacifying product, pulverulent, acid reacting, calcined, salt-free $TiO_2$ containing at least 80% anatase, from 0.1 to 3.0% by weight of adsorbed $H_2SO_4$ and having a projected group average particle diameter of less than 0.1 micron.

2. The product of claim 1 in which its average particle diameter ranges from .01 to 0.1 micron and at least 95% of the product passes a 325 mesh screen.

3. A process for preparing a pulverulent, acid-reacting anatase $TiO_2$ product having an average particle diameter of less than 0.1 micron adapted for use in ceramic glass formulations which comprises calcining at 650–850° C. a previously washed, salt-free anatase raw pigment $TiO_2$ precipitate recovered from a titanium sulfate solution hydrolysis, and continuing said calcination until from 0.1 to 3% of adsorbed $H_2SO_4$ remains in said $TiO_2$.

4. The process of claim 3 in which the final $TiO_2$ product has an acid reaction in water, at least 80% of said product is in the anatase crystalline modification, its average particle diameter is in the range of from .01 to 0.1 microns, and at least 99% thereof passes a 325 mesh screen.

References Cited

UNITED STATES PATENTS

| | | | |
|---|---|---|---|
| Re. 18,854 | 3/1931 | Blumenfeld | 23—202 |
| 2,933,408 | 4/1960 | Dempster et al. | 106—300 |
| 3,062,673 | 11/1962 | Wigginton | 106—300 |
| 3,211,528 | 10/1965 | Wigginton | 106—300 XR |
| 3,220,867 | 11/1965 | Schaughnessy | 106—300 |
| 3,341,291 | 9/1967 | Mabbs et al. | 106—300 XR |

TOBIAS E. LEVOW, Primary Examiner

H. M. S. SNEED, Assistant Examiner

U.S. Cl. X.R.

106—47, 48